US010895121B2

(12) United States Patent
Manum et al.

(10) Patent No.: US 10,895,121 B2
(45) Date of Patent: Jan. 19, 2021

(54) SYSTEM AND METHOD FOR MONITORING THE STATE OF A CHOKE VALVE IN A MANAGED PRESSURE DRILLING SYSTEM

(71) Applicant: STATOIL PETROLEUM AS, Stavanger (NO)

(72) Inventors: Henrik Manum, Trondheim (NO); Qin Li, Porsgrunn (NO)

(73) Assignee: EQUINOR ENERGY AS, Stavanger (NO)

(*) Notice: Subject to any disclaimer, the term of this patent is extended or adjusted under 35 U.S.C. 154(b) by 320 days.

(21) Appl. No.: 15/756,874

(22) PCT Filed: Sep. 2, 2016

(86) PCT No.: PCT/NO2016/050181
§ 371 (c)(1),
(2) Date: Mar. 1, 2018

(87) PCT Pub. No.: WO2017/039458
PCT Pub. Date: Mar. 9, 2017

(65) Prior Publication Data
US 2018/0266198 A1     Sep. 20, 2018

(30) Foreign Application Priority Data
Sep. 4, 2015  (GB) .................................. 1515704.3

(51) Int. Cl.
*E21B 21/08*  (2006.01)
*E21B 21/10*  (2006.01)
(Continued)

(52) U.S. Cl.
CPC ............ *E21B 21/08* (2013.01); *E21B 21/106* (2013.01); *F16K 37/0083* (2013.01);
(Continued)

(58) Field of Classification Search
CPC ........ E21B 21/08; E21B 21/106; E21B 43/12; E21B 34/02; E21B 44/00; F16K 37/0083;
(Continued)

(56) References Cited

U.S. PATENT DOCUMENTS

| 2009/0125154 A1 | 5/2009 | Yli-Koski |
| 2010/0206560 A1 | 8/2010 | Atencio |

(Continued)

FOREIGN PATENT DOCUMENTS

| WO | 2013/005091 | 1/2013 |
| WO | 2014/007797 | 1/2014 |

(Continued)

OTHER PUBLICATIONS

International Search Report dated Nov. 15, 2016 in International Application No. PCT/NO2016/050181.
(Continued)

*Primary Examiner* — Nathaniel T Woodward
(74) *Attorney, Agent, or Firm* — Wenderoth, Lind & Ponack, L.L.P.

(57) ABSTRACT

A method of monitoring the state of a choke valve in a managed pressure drilling system using a valve state parameter to represent the state of the choke valve includes measuring the flow rate of a material across the choke valve, measuring the pressure differential of the material across the choke valve, obtaining a valve characteristic of the choke valve, and calculating the valve state parameter using the flow rate, the pressure differential and the valve characteristic.

15 Claims, 1 Drawing Sheet

(51) Int. Cl.
*F16K 37/00* (2006.01)
*G01F 1/74* (2006.01)
*G01F 15/00* (2006.01)
*G01L 13/00* (2006.01)
*G01L 19/00* (2006.01)
*G01N 9/36* (2006.01)

(52) U.S. Cl.
CPC ............ *F16K 37/0091* (2013.01); *G01F 1/74* (2013.01); *G01F 15/005* (2013.01); *G01L 13/00* (2013.01); *G01L 19/0092* (2013.01); *G01N 9/36* (2013.01)

(58) Field of Classification Search
CPC ...... F16K 37/0091; G01F 1/74; G01F 15/005; G01L 13/00; G01L 19/0092; G01N 9/36
See application file for complete search history.

(56) References Cited

U.S. PATENT DOCUMENTS

| | | |
|---|---|---|
| 2013/0240045 A1 | 9/2013 | Feng |
| 2014/0144225 A1 | 5/2014 | Johnson et al. |
| 2015/0240579 A1* | 8/2015 | Lovorn ................... E21B 21/08 166/373 |
| 2016/0076322 A1* | 3/2016 | Oddie ................. G01F 25/0092 73/152.51 |

FOREIGN PATENT DOCUMENTS

| | | |
|---|---|---|
| WO | 2014/183136 | 11/2014 |
| WO | 2016/057645 | 4/2016 |
| WO | 2016/093859 | 6/2016 |

OTHER PUBLICATIONS

Written Opinion of the International Searching Authority dated Nov. 15, 2016 in International Application No. PCT/NO2016/050181.
Patents Act 1977: Search Report under Section 17(5) issued by the UK-IPO on May 4, 2016 in corresponding Great Britain Application No. 1515704.3.
Duus, A.C. "Simple Well-Model Based on Basic Physical Principles", M.Sc. thesis, Norwegian University of Science and Technology (NTNU), Jun. 2013.

* cited by examiner

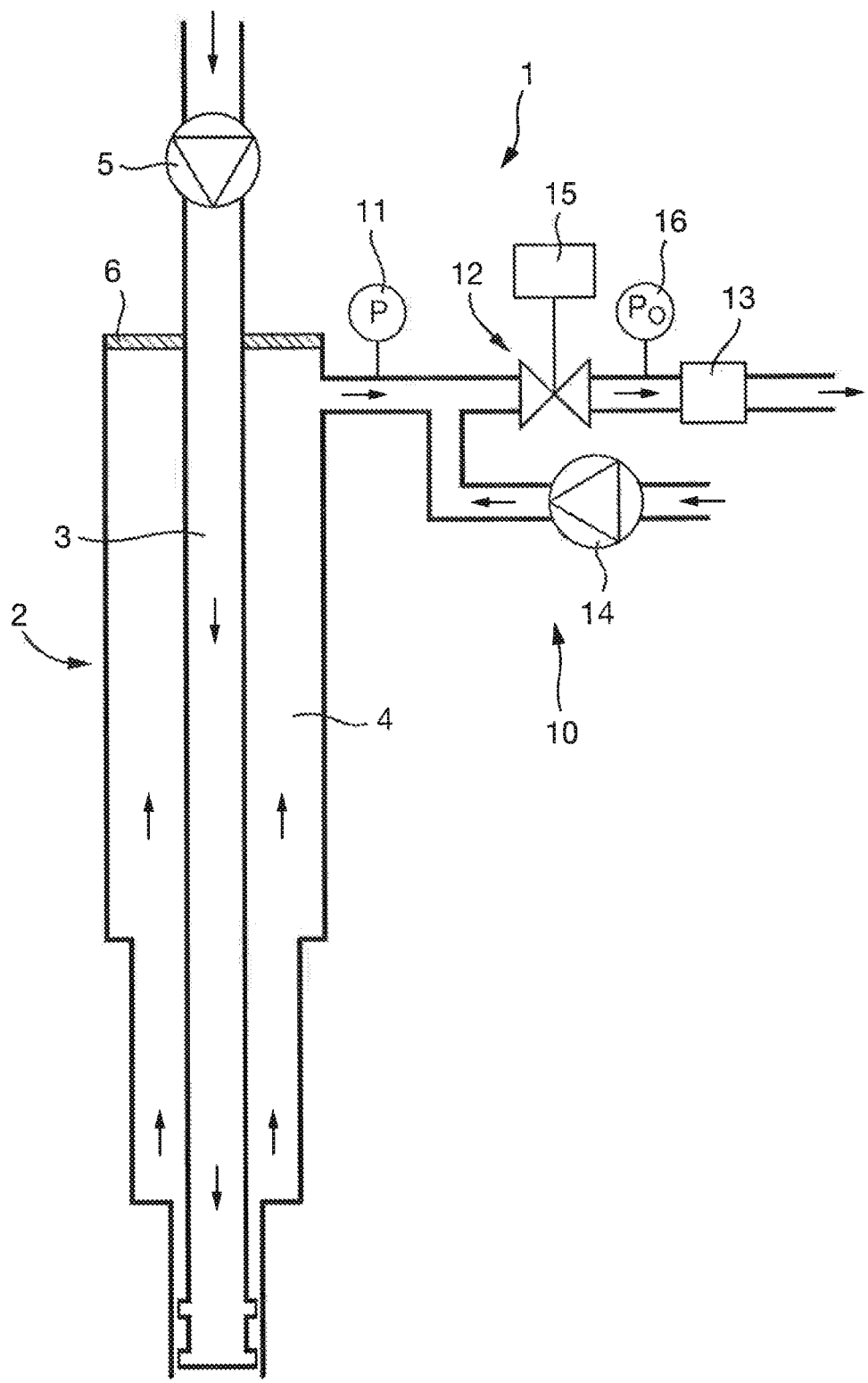

SYSTEM AND METHOD FOR MONITORING THE STATE OF A CHOKE VALVE IN A MANAGED PRESSURE DRILLING SYSTEM

The invention relates to a method of monitoring the state of a choke valve in a managed pressure drilling system, and a managed pressure drilling system.

In a managed pressure drilling system, material such as mud and cuttings is circulated through a pressurised system in order to maintain an optimal pressure at a location in the system, such as the drilling location or at a casing shoe. The pressure is controlled at least partly by a choke valve in the system that is located at a topside of the system and produces a back pressure that regulates the pressure at the drilling location. The extent of the opening of the choke valve at least partly determines the back pressure.

It is therefore important to ensure that the operator is aware of the extent of the opening of the choke valve. This is usually just taken to be the position to which the opening of the choke valve is set. However, the choke valve may be affected by the material passing through it. For example, the mud and cuttings may fully or partially plug the choke valve, or the mud and cuttings may washout the choke valve by wearing it over time. If the choke valve is affected in these ways, the position to which the choke valve is set will not be its actual opening position, which may lead to incorrect control of the pressure of the system and could lead to sub-optimal or even dangerous operating conditions.

In one aspect the invention provides a method of monitoring the state of a choke valve in a managed pressure drilling system using a valve state parameter to represent the state of the choke valve, the method comprising: measuring the flow rate of a material across the choke valve, measuring the pressure differential of the material across the choke valve, obtaining a valve characteristic of the choke valve, and calculating the valve state parameter using the flow rate, the pressure differential and the valve characteristic.

Using a valve state parameter in this way to represent the state of the choke valve is advantageous since such a valve state parameter can be calculated using measurable variables of the system and can be compared to threshold values in order to, for instance, raise alarm signals. In example implementations of the invention the valve state parameter is a value that can be derived from variables of the system and which remains constant unless the state of the choke valve changes. Thus, it eases both the finding of the state of the choke valve, and the checking of whether the state of the choke valve is healthy. The state of the choke valve, as discussed herein, relates to the ability of the choke valve to regulate flow of fluid therethrough in accordance with the design parameters of the choke valve. The state of the choke valve may take account of indications of plugging or washout of the choke valve, for example. This would give rise to an unexpected and unwanted reduction or increase in flow through the valve compared to the intended flow required by the operator. It is important to be able to quickly identify changes to the state of the choke valve such as plugging or washout.

The valve state parameter, K, may be calculated using the formula $$K = \frac{q}{g(z)\sqrt{\frac{p - p_0}{\rho}}}$$

wherein q is the flow rate of a material across the choke valve, g(z) is the valve characteristic of the choke valve, p is the pressure of the material upstream of the choke valve, $p_0$ is the pressure of the material downstream of the choke valve and $\rho$ is the density of the material. This equation is derived from Bernoulli's equation, which is based upon Newton's second law being applied to incompressible flow over sudden contraction. The skilled person would recognise that any minor changes to Bernoulli's equation fall within the scope of the above general formula, i.e. it is intended for any use of the above general formula to be covered. Thus, the valve state parameter K may be calculated using the above formula, variations of this formula, or any similar formula derived from Bernoulli's equation or with a similar functional relationship between flow rate, pressures, and a choke valve characteristic. For example, the skilled person could normalise or parameterise any of the variables in the above equation, and the same physical law would be being utilised. Thus, the above equation is intended to cover all such equations that the skilled person would recognise as the same physical law.

For example, the skilled person could use the above formula by first finding a nominal K value, $K_0$, for a nominal density value, $\rho_0$, using the formula:

$$K_0 = \frac{q}{g(z)\sqrt{\frac{p - p_0}{\rho_0}}}.$$

The value of valve state parameter K at any density $\rho$ could then be found using the formula:

$$K = K_0 \sqrt{\frac{\rho}{\rho_0}}.$$

It is clear that parameter K being calculated in this way is still being calculated using the general formula $$K = \frac{q}{g(z)\sqrt{\frac{p - p_0}{\rho}}}.$$

This variation, and any other similar variation that is merely a mathematical manipulation of the above formula, is intended to be covered by the formula. Using the valve state parameter K to represent the state of the valve allows for the state of the valve to be calculated using the above formula. Using this formula is advantageous since all of its variables can be measured or calculated whilst the system is running, and without significantly perturbing the system as it runs.

The pressure differential, the flow rate and the valve characteristic can all be measured whilst the system is online, without significantly affecting or perturbing the functioning of the system. Thus, the present method allows the system to be monitored whilst it is online, and so can reduce down time of the system. Thus, it is possible to monitor the state of the choke valve over time as the system is running, and hence detect variations in the state of the choke as the variations occur. This allows for earlier detection of undesired washouts or pluggings. By "online" it is meant when the managed pressure drilling system is in operation.

The density of the material may also be used in monitoring the state of the choke valve, Again, this can be measured without significantly affecting or perturbing the functioning of the system.

The monitoring of the choke valve may occur substantially continuously, or may be done at certain time intervals, e.g. every 10 s, 1 s, 0.5 s, 0.1 s, 0.01 s or 0.001 s. The measurements of flow rate, pressure differential, valve characteristic and/or density may occur substantially continuously, or may be done at certain time intervals, e.g. every 10 s, 1 s, 0.5 s, 0.1 s, 0.01 s or 0.001 s. The measurements may be taken simultaneously. This can allow for real time monitoring of the system to detect washout or plugging as it occurs. This can improve the efficiency and safety of the system.

The valve state parameter may be calculated using an estimation method. The estimation method may be any suitable estimation method, but may preferably be a recursive method or a regression method, such as a least squares regression. Using such methods reduces the noise of the calculated valve state parameter. The valve state parameter may be calculated using a plurality of flow rate, pressure differential and valve characteristic values, and optionally a plurality of the material density values.

The valve state parameter may be calculated directly. This can produce the calculated valve state parameter value with significant noise. However, it can be less expensive in terms of computing power. To reduce the noise a filter may be used.

The valve state parameter may be considered to be the gain of the choke valve, or representative of the gain of the choke valve.

The method may comprise triggering an alarm signal if the state of the choke valve is outside of a pre-determined range. The alarm signal may be used to alert a user/operator that the state of the choke valve is outside of the pre-determined range.

Thus, if valve state parameter is greater than a threshold, an alarm signal may be triggered. This alarm signal would be indicative of washout. If valve state parameter is less than a threshold, the alarm signal may be triggered. This alarm signal would be indicative of plugging.

There may be a multi-stage alarm system. Thus, if the state of the choke valve is found to be outside of a first pre-determined range, a first alarm may be raised. The first alarm may be indicative of a high/low, but not dangerous, valve state parameter value. The first alarm may be an early indication that the state of the choke valve is not optimal.

If the state of the choke valve is found to be outside of a second pre-determined range, a second alarm may be raised. The second range may be a wider range than the first range and may encompass the entire first range. Thus, the state of the valve may be such that the first alarm may be raised without the second alarm being raised, but the second alarm may not be raised without the first alarm being raised. The second alarm may be indicative of a very high/low, dangerous, valve state parameter value. The second alarm may provide an indication that the choke valve needs to be replaced.

Thus, both an early indication of washing/plugging and a dangerous indication of washing/plugging can be given. Between the first and second alarms, the system may continue to run, but may need to be monitored more closely.

In the case where multiple parallel choke valves are used (see below), the triggering of the second alarm may also automatically switch the system to using another choke valve and making the present choke valve redundant. Alternatively, this may be done manually.

The alarm may only be triggered if the state of the choke valve is outside of the pre-determined range for a pre-determined length of time. This allows several states to be calculated before triggering the alarm, which allows the method to check for consistent and persistent states outside of the pre-determined range. This helps to safeguard against false positives. For example, an alarm may not be triggered unless the state is outside of the pre-determined range for more than 0.1 s, 0.5 s or 1 s. Alternatively, or in addition, an alarm may not be triggered unless there are at least 5, 10, 20 or 50 consecutive samples continuously outside of the predetermined range.

The method may comprise calculating the valve characteristic of the choke valve. The valve characteristic may be calculated as a function of the position of the choke valve. The valve characteristic may be a function of the position of the choke valve. The position of the choke valve may be the extent to which it is open/closed. The position of the choke valve may be the position of the drive (see below). The position of the choke valve may be a distance, z. The distance z may be the distance between opposite sides of the valve. The valve characteristic may be a normalised function, preferably with values between 0 and 1. The valve characteristic may not be normalised. The valve characteristic may be a linear function. The valve characteristic may be a non-linear function.

The valve characteristic may relate to how the choke valve affects the system in different positions, e.g. how the choke valve affects flow rate and pressure of the material passing through the choke valve.

The valve characteristic may relate flow rate across the choke valve and pressure differential across the choke valve (i.e. the valve characteristics) to valve position. Thus, the valve characteristic may be a relationship between the same parameters as the valve state parameter. Thus, during the estimation both values of the valve characteristic and the valve state parameter may be found that best fit the measured data (e.g. the pressure differential, the flow rate, the valve position, the density).

The method may comprise measuring the position of the choke valve and calculating the valve characteristic from the measured position.

The position of the choke valve may be measured directly. This can produce an accurate measurement of the position, though it is difficult to obtain such measurements when the system is running.

Preferably, however, the position of the choke valve may be measured indirectly, for example by measuring the position of a drive that is configured to drive the choke valve. This is advantageous since the drive is remote from the material flow and so can easily be measured. The drive may be configured to alter the position of the choke valve. Thus, by measuring the position of the drive, the position of choke valve can be known. Alternatively, it could be considered that the valve characteristic may be calculated as a function of the position of the drive. The drive may be a motor, preferably electric. The drive may be a hydraulic drive.

In operation, the choke valve may be controlled to open to a given set point. The set point may be used as the position of the choke valve. The set point may be a position of the choke valve or a position of the drive.

The valve characteristic may be calculated from the measured position of the choke valve and/or drive since the valve characteristic for each valve position may be known, e.g. in a look up table. The valve characteristic for each position may be known as it may be provided by the vendor, but it is preferably found by a calibrating process.

Measuring the position of the drive, however, may have some disadvantages. For instance, since it is an indirect measurement of the position of the choke valve, some error may be involved. Due to the possible flexibility or looseness in the transmission of the motion between the drive and the choke valve, for example, there may be backlash present that produces a systematic error.

The method may comprise calibrating the valve characteristic of the choke valve as a function of the position of the choke valve. The method may comprise calibrating the valve characteristic of the choke valve as a function of the position of the drive.

The calibration may occur before the system is online. The calibration of the choke valve may need to be carried out when the choke is part of the entire system, i.e. it may not be carried out on just the choke valve in isolation. This gives a more accurate calibration. Further, the calibration may not be modelled, since it is the physical hardware of the system that needs to be calibrated. The calibration may occur during commissioning of the system. This may be advantageous since in the field of oil and gas the commissioning of the system is a necessary process required for other reasons. Doing the calibration during this time therefore minimises downtime of the system.

The method may comprise recalibrating the valve characteristic. Recalibration may be carried out whenever it is possible to do so. For instance, if the system is offline for some other reason, the valve characteristic may be recalibrated. Recalibration may occur at intervals of around 4 weeks, 3 weeks, 2 weeks, 1 week, 4 days, 3 days, 2 days or 1 day.

The valve characteristic calibration can be achieved by any appropriate method. Preferably, however, the valve characteristic calibration can be achieved using an online calibration method.

The calibration method may comprise: a) fully opening the choke valve; b) producing maximum flow rate in the system, e.g. 2000 l/min using a rig pump or a back pressure pump of the system; c) decreasing the opening of the choke valve in steps; d) measuring the pressure differential across the valve, valve position and flow rate across the valve for each valve position.

The opening of the valve may be decreased whilst maintaining the rig/back pressure pump working at its maximum capacity. The decreasing of the opening in step c) may occur until a differential pressure limit is reached. At this stage, the calibration may comprise: e) decreasing the flow rate, e.g. by adjusting the rig/back pressure pump; f) further decreasing the opening of the choke valve in steps and taking the measurements at each position. Again, when the differential pressure limit is reached, steps e) and f) may be repeated until the choke valve is fully closed.

Once the choke valve is fully closed, the pump may be stopped. The pump may then be cycled on and off to pressurise the line upstream of choke. The choke may then be opened slowly to detect when the choke opens.

The calibration process may then continue in the opening direction. This would effectively be the inverse of steps a) to f) described above, e.g. increasing the opening of the choke valve in steps and measuring the pressure differential across the choke valve, the valve position and the flow rate across the valve for each position until the valve is fully open. The work of the pump may be increased as the opening of the choke valve increases.

Alternatively, the calibration method may be performed in the opposite order, i.e. starting with the choke valve closed, increasing the opening in steps until it is fully opened, and then decreasing the opening until the choke valve is fully closed.

The valve characteristic may be normalised between 0 and 1. The value 0 may be when the valve is fully closed. The value 1 may be when the valve is fully opened. Alternatively, the valve characteristic may not be normalised.

The values of the valve characteristic as a function of valve position may be stored, e.g. in a look up table. Thus, when monitoring the state of the choke valve, the choke valve position may be measured and the corresponding valve characteristic may be obtained, e.g. from the look up table.

To address the issue of possible backlash in the system, two different valve characteristics may be calculated. The first may be an opening valve characteristic that may be calculated/calibrated when the choke valve is being moved to a more open position. The second may be a closing valve characteristic that may be calculated/calibrated when the choke valve is being moved to a more closed position.

When monitoring the state of the choke valve, the method may include monitoring the direction in which the choke valve is being (or has been) moved. If the choke valve is being (or has been) moved in an opening direction, the opening valve characteristic may be used. If the choke valve is being (or has been) moved in a closing direction, the closing valve characteristic may be used. The opening valve characteristic may be $g_{open}(z)$ and the closing valve characteristic may be $g_{close}(z)$.

The method may comprise measuring the flow rate of the material across the choke valve. This may be done by using a flow meter, e.g. a Coriolis flow meter. The flow meter may be located near the choke valve, e.g. just upstream or just downstream of the choke valve. The flow meter may be independent of the choke valve. The flow rate used in the present invention may be the mass flow rate, but is preferably volumetric flow rate. The volumetric flow rate may be beneficial for use with the above formula.

The method may comprise measuring the pressure differential of the material across the choke valve. This may be done by measuring the pressure of the material at an upstream location and a downstream location. These locations may be close to the choke valve, e.g. less than 10 m, 5 m or 1 m from the choke valve. The pressure may be measured using pressure sensors.

The pressure differential may be measured using a differential pressure sensor. The differential pressure sensor may be located proximate the choke valve. The differential pressure sensor may be integral with the choke valve.

The method may comprise measuring the density of the material. This may be done using any suitable meter such as a density meter or a flow meter, preferably a mass flow meter, preferably a Coriolis meter. The flow meter may be the same as the flow meter used to measure the flow rate. The density may also be derived from pressure readings in the riser and/or wellbore. The density may be measured near the choke valve. The density may be measured upstream of choke valve, but is preferably measured downstream of the choke valve. The density may be measured close to the choke valve, e.g. less than 10 m, 5 m or 1 m from the choke valve. The density is the density of the material passing across the choke valve. The density may be constant, and so may not be continuously measured. The density may vary, and hence may be measured over time, preferably at the same time as the other measurements are made.

The material may be the material passing through the system, preferably the choke valve, when the measurements are taken. The material may include mud. The material may include cuttings from the drilling location.

The choke valve may be a first choke valve and the system may comprise a second choke valve in parallel with the first choke valve. The second choke valve may provide for choke valve redundancy. The method may comprise switching from using the first choke valve to using the second valve when the state of the choke valve is outside of a pre-determined range, There may be three, four or five, or more, choke valves in parallel. The method may comprise switching between the choke valve and another healthy choke valve when the state of the choke valve is outside of a pre-determined range.

In another aspect the invention provides a managed pressure drilling system, comprising a choke valve for use in controlling the pressure in the system; a sensor for measuring a differential pressure of a material in the system across the choke valve; a flow meter for measuring the flow rate of the material across the valve; a position sensor for measuring the position of the choke valve, the system being configured to monitor the state of a choke valve using a valve state parameter to represent the state of the choke valve by measuring the flow rate of a material across the choke valve using the flow meter, measuring the pressure differential of the material across the choke valve using the sensor for measuring the differential pressure of the material across the choke valve, obtaining a valve characteristic of the choke valve using the position sensor, and calculating the valve state parameter using the flow rate, the pressure differential and the valve characteristic.

The system may also comprise a density sensor for measuring the density of the material passing across the choke valve.

The sensor for measuring the differential pressure of the material in the system across the choke valve may comprise a first pressure sensor upstream of the choke valve for measuring the pressure of a material in the system upstream of the choke valve and a second pressure sensor downstream of the choke valve for measuring the pressure of the material in the system downstream of the choke valve.

The sensor for measuring the differential pressure of the material in the system across the choke valve may comprise a differential pressure sensor.

The system may also comprise a processor to which the sensors may be connected. The processor may be configured to perform any of the above discussed methods. For example, the processor may be configured to calculate the valve state parameter, K, using the formula $$K = \frac{q}{g(z)\sqrt{\frac{p - p_0}{\rho}}}$$

wherein q is the flow rate of a material across the choke valve, g(z) is the valve characteristic of the choke valve, p is the pressure of the material upstream of the choke valve, $p_0$ is the pressure of the material downstream of the choke valve and ρ is the density of the material.

Further, the processor may be configured to monitor the choke valve substantially continuously, or at certain time intervals, e.g. every 10 s, 1s, 0.5 s, 0.1 s, 0.01 s or 0.001 s.

The measurements of flow rate, pressure differential, valve characteristic and/or density may occur substantially continuously, or may be done at certain time intervals, e.g. every 10 s, 1 s, 0.5 s, 0.1 s, 0.01 s or 0.001 s. This can allow for real time monitoring of the system to detect washout or plugging as it occurs. This can improve the efficiency and safety of the system.

The processor may be configured to calculate valve state parameter using an estimation method. The estimation method may be any suitable estimation method, but may preferably be a recursive method or a regression method, such as a least squares regression. Using such methods reduces the noise of the calculated valve state parameter.

The processor may be configured to calculate the valve state parameter directly. This can produce the calculated valve state parameter value with significant noise. However, it can be less expensive in terms of computing power. To reduce the noise a filter may be used.

The processor may be connected to, or may be part of, a controller.

Further, the processor or controller may be configured to trigger an alarm signal if the state of the choke valve is outside of a pre-determined range. The alarm signal may be used to alert a user/operator that the state of the choke valve is outside of the pre-determined range.

Thus, the processor or controller may be configured such that, if valve state parameter is greater than a threshold, an alarm signal is triggered. This alarm signal would be indicative of washout. The processor or controller may be configured such that, if valve state parameter is less than a threshold, the alarm signal is triggered. This alarm signal would be indicative of plugging.

The system may comprise a multi-stage alarm system. Thus, the processor or controller may be configured such that, if the state of the choke valve is found to be outside of a first pre-determined range, a first alarm is raised. The first alarm may be indicative of a high/low, but not dangerous, valve state parameter value. The first alarm may be an early indication that the state of the choke valve is not optimal.

The processor or controller may be configured such that, if the state of the choke valve is found to be outside of a second pre-determined range, a second alarm is raised. The second range may be a wider range than the first range and may encompass the entire first range. Thus, the state of the valve may be such that the first alarm may be raised without the second alarm being raised, but the second alarm may not be raised without the first alarm being raised. The second alarm may be indicative of a very high/low, dangerous, valve state parameter value. The second alarm may provide an indication that the choke valve needs to be replaced.

Thus, the processor or controller may be configured such that both an early indication of washing/plugging and a dangerous indication of washing/plugging can be given. Between the first and second alarms, the system may continue to run, but may need to be monitored more closely.

In the case where multiple parallel choke valves are used, the processor or controller may be configured such that the triggering of the second alarm may also automatically switch the system to using another choke valve and making the present choke valve redundant. Alternatively, this may be done manually.

The processor or controller may be configured such that the alarm is only triggered if the state of the choke valve is outside of the pre-determined range for a pre-determined length of time. This allows several states to be calculated before triggering the alarm, which allows the method to check of consistent and persistent states outside of the pre-determined range. This helps to safeguard against false positives. For example, an alarm may not be triggered unless the state is outside of the pre-determined range for more than 0.1 s, 0.5 s or 1 s.

The system may comprise a drive, such as a motor, preferably an electric motor, or a hydraulic drive, connected to the choke valve for driving the choke valve. The position sensor may be configured to measure the position of the drive.

The choke valve may be a first choke valve. The system may comprise a second choke valve in parallel to the first choke valve. The second choke valve may provide redundancy to the system. There may be three, four or five choke valves in parallel. Each choke valve may have a respective position sensor for measuring the position of each respective choke valve.

The system may be configured such that the same sensors may be used to detect the state of each choke valve.

Each choke valve may have respective differential pressure sensors, flow sensors and/or pressure sensors. The sensors of each choke valve may be connected to respective processors or to the same processor. The processor(s) may be configured to perform any of the above discussed methods. Each choke valve may be connected to respective drives for driving each choke individually.

The differential pressure sensor, the pressure sensors, the choke valve and/or the flow meter may be located at a topside of the system. The topside may be connected to a wellbore annulus or a riser such that material can pass between the wellbore annulus or the riser and the topside, such that material can pass from the bottom of the wellbore to the choke valve.

BRIEF DESCRIPTION OF THE DRAWING

A preferred embodiment will now be described, by way of example only, with reference to the accompanying FIGURE, in which:

FIG. 1 shows a schematic view of a managed pressure drilling system that may be used to perform the method of the present invention.

DETAILED DESCRIPTION OF PREFERRED EMBODIMENT

The system 1 comprises a wellbore 2. The wellbore 2 comprises an inner bore 3 and an outer annulus 4. The upstream end of inner bore 3 is connected to a rig pump 5. The downstream end of inner bore 3 ends proximate the bottom of the wellbore 2. The rig pump 5 is fed with material, such as mud, from a pit and pumps the material to the bottom of the wellbore 2 through the inner bore 3. The upstream end of the annulus 4 is located at the bottom of the wellbore 2. Thus, in use, material, such as mud and cuttings, enters the bottom of the annulus 4 and flows upward through the annulus 4. The upward flow of the material occurs due to pressure at the bottom of the annulus 4 being greater than pressure at the top of the annuls 4. At the top of the annulus 4 there is a seal 6 that seals between the inner bore 3 and the annulus 4 to prevent material exiting the annulus 4 where the inner bore 3 enters the annulus 4. The annulus 4 may be formed between an outer casing and the casing of the inner bore 3 that passes through the outer casing.

Proximate the top of the wellbore 2 and annulus 4 there is a topside 10. The topside 10 is connected to the annulus 4 such that material may flow between the topside 10 and the upper part of the annulus 4. The topside comprises an upstream pressure sensor 11, a choke valve 12, a downstream pressure sensor 16 and a flow meter 13 connected together with lines that allow the flow of material therethrough. The upstream pressure sensor 11 is located between the annulus 4 and the choke valve 12, the choke valve 12 is located between the downstream pressure sensor 16 and the upstream pressure sensor 11, and the downstream pressure sensor 16 is located between the flow meter 13 and the choke valve 12. In use, the upstream pressure sensor 11 is upstream of the choke valve 12 which in turn is upstream of the downstream pressure sensor 16 which in turn is upstream of the flow meter 13 and they are connected with lines in series. Material exits the annulus 4 near the top of the annulus 4 into the topside 10, passes by the upstream pressure sensor 11, passes through choke valve 12 (if it is open) and then passes by the downstream pressure sensor 16 and through flow meter 13. The material exiting the flow meter 13 may be discarded, or may be stored in the pits (not shown).

The choke valve 12 is driven by a drive 15. The drive 15 drives the choke valve 12 to open and close the choke valve 12.

The topside 10 also comprises a back pressure pump 14. A line exiting the back pressure pump 14 is connected to the line between the pressure sensors 11 and the choke valve 12. The back pressure pump 14 is fed with material, such as mud, from a pit and, when in use, pumps the material to the line upstream of the choke valve 12.

It is very important to control the pressure in the wellbore 2, and in particular the wellbore annulus 4, so as to maintain the correct pressure at the bottom of the wellbore 2. If the pressure is too low this can lead to an influx of hydrocarbons into the well during drilling. If the pressure is too high this can lead to wellbore 2 fracture, for example the casings may fracture. The pressure is controlled using the rig pump 5 and the choke valve 12 in combination. As can be appreciated, the choke valve 12 can provide a varying back pressure into the wellbore 2. Further, when the rig pump 5 is off or working at low capacity, the back pressure pump 14 may be used to provide back pressure to the wellbore 2. The flow of material in the system is shown in the arrows of FIG. 1. The pressure sensor 11 and the flow meter 13 are typically used to monitor the system. For instance, the pressure sensor 11 is used to detect whether the pressure of the material in the system is acceptable.

Regarding the present method, it utilises the existing components of the managed pressure drilling system for a different additional purpose. The upstream pressure sensor 11, the downstream sensor 16, the flow sensor 13 and the drive 15 are connected to a processor that is part of a controller (not shown). The processor is configured to measure the pressure using the upstream pressure sensor 11 and the downstream pressure sensor 16, to control the opening/closing of the choke valve 12 using the drive 15 and to measure the flow rate using the flow sensor 13.

Regarding the present method, the pressure upstream of the choke 12 is sensed by the upstream pressure sensor 11 and is measured by the processor. The pressure downstream of the choke 12 is sensed by the downstream pressure sensor 16 and is measured by the processor. The position of the drive 15 is measured, or is set, by the processor. The processor converts the position of the drive 15 into a valve characteristic. The flow meter 13 detects the flow rate of material and the processor measures the flow rate of the material. These four steps occur substantially simultaneously such that all four measurements are taken at a certain time.

The processor then uses these four measurements to calculate a valve state parameter K using the $$\text{formula} = \frac{q}{g(z)\sqrt{\frac{p-p_0}{\rho}}},$$

where q is the flow rate, p is the upstream pressure, $p_o$ is the downstream pressure, g(z) is the valve characteristic and ρ is the density of the material. The density of the material is known. Valve state parameter K is representative of the state of the valve. The processor calculates valve state parameter K using an estimation method.

The processor then compares the calculated value of the valve state parameter K to a first pre-determined range. If the valve state parameter K is inside of this range, no alarm is raised. If the valve state parameter K is outside of this range, then an early indication alarm is raised. The early indication alarm alerts the user/operator that the state of the choke valve is no longer optimal, but is not yet critical.

The processor also compares the calculated value of the valve state parameter K to a second pre-determined range that is larger than the first pre-determined range. If the valve state parameter K is outside this range, an alarm is raised indicating that the state of the choke valve is critical. This alerts the user/operator that the choke valve needs to be replaced or serviced.

The controller is configured such that it only raises the alarm(s) if the valve state parameter K is outside of the first and/or second pre-determined range for a certain time period, such as 0.5 s.

The processor continuously monitors value of the valve state parameter K by taking measurements of the pressure and the flow rate at regular frequent time intervals, such as every 0.1 s.

Prior to the system running, the valve characteristic g(z) is calibrated for the choke valve 12 in the system 1. The valve characteristic of the choke valve 12 as a function of the position of the drive 15 z is found during the calibration. Further, the choke valve characteristic is recalibrated using the same method at regular intervals, such as every week.

The valve characteristic calibration is achieved using an online calibration method. The calibration method may comprises: a) fully opening the choke valve 12; b) producing maximum flow rate in the system, e.g. 2000 l/min using the rig pump 5 or the back pressure pump 14 of the system 1; c) decreasing the opening of the choke valve 12 in steps; d) measuring the pressure differential across the choke valve 12 using the upstream 11 and downstream 16 pressure sensors, valve position z and flow rate across the choke valve 12 for each valve position.

Step c) is performed whilst maintaining the rig/back pressure pump working at its maximum capacity. The step wise decreasing of the opening in step c) occurs until a differential pressure limit is reached. At this stage, the calibration comprises: e) decreasing the flow rate by adjusting the rig/back pressure pump; f) further decreasing the opening of the choke valve 12 in steps and taking the measurements at each position. Again, if and when the differential pressure limit is reached, steps e) and f) are repeated until the choke valve 12 is fully closed.

Once the choke valve 12 is fully closed, the pump 5, 14 may be stopped. The pump 5, 14 may then be cycled on and off to pressurise the line upstream of choke. The choke 12 may then be opened slowly to detect when the choke 12 opens.

The calibration process then continues in the opening direction. This is effectively the inverse of steps a) to f) described above. Thus, the opening of the choke valve 12 is increased in steps and the pressure differential across the choke valve 12 is measured pressure differential across the choke valve 12, the valve position and the flow rate across the valve 12 for each position until the valve 12 is fully open. The work of the pump 5, 14 may be increased as the opening of the choke valve 12 increases.

In this way the valve characteristic g(z) is be calibrated in relation to drive position z.

The invention claimed is:

1. A method of monitoring a state of a choke valve in a managed pressure drilling system using a valve state parameter to represent the state of the choke valve, the method comprising:
    measuring a flow rate of a material across the choke valve;
    measuring a pressure differential of the material across the choke valve;
    obtaining a valve characteristic of the choke valve;
    calculating the valve state parameter using the flow rate, the pressure differential and the valve characteristic; and
    triggering an alarm signal when the state of the choke valve is outside of a pre-determined range, wherein the alarm signal is indicative of washout or plugging.

2. The method as claimed in claim 1, wherein the valve state parameter, K, is calculated using the formula $$K = \frac{q}{g(z)\sqrt{\frac{p-p_0}{\rho}}}$$

wherein q is the flow rate of a material across the choke valve, g(z) is the valve characteristic of the choke valve, p is the pressure of the material upstream of the choke valve, $p_0$ is the pressure of the material downstream of the choke valve and ρ is the density of the material.

3. The method as claimed in claim 1, wherein the pressure differential, the flow rate and the valve characteristic are all measured whilst the system is online.

4. The method as claimed in claim 1, wherein the monitoring of the choke valve occurs substantially continuously.

5. The method as claimed in claim 1, wherein the valve state parameter is calculated using an estimation method.

6. The method as claimed in claim 1, wherein the alarm signal is a first alarm signal and the pre-determined range is a first pre-determined range, the method further comprising triggering a second alarm signal when the choke valve is outside of a second pre-determined range, the second pre-determined range being wider than the first pre-determined range.

7. The method as claimed in claim 1, where the alarm signal is only triggered when the state of the choke valve is outside of the pre-determined range for a pre-determined length of time.

8. The method as claimed in claim 1, further comprising calculating the valve characteristic of the choke valve.

9. The method as claimed in claim 1, further comprising calibrating the valve characteristic of the choke valve as a function of a position of the choke valve and/or a position of a drive that is configured to drive the choke valve.

10. The method as claimed in claim 1, further comprising measuring the density of the material.

11. A managed pressure drilling system, comprising:
a choke valve for use in controlling a pressure in the system;
a sensor for measuring a differential pressure of a material in the system across the choke valve;
a flow meter for measuring a flow rate of the material across the valve; and
a position sensor for measuring a position of the choke valve, the system being configured to monitor a state of a choke valve using a valve state parameter to represent the state of the choke valve by measuring the flow rate of a material across the choke valve using the flow meter, measuring the pressure differential of the material across the choke valve using the sensor for measuring the differential pressure of the material across the choke valve, obtaining a valve characteristic of the choke valve using the position sensor, and calculating the valve state parameter using the flow rate, the pressure differential and the valve characteristic, and wherein the system is configured to trigger an alarm signal when the state of the choke valve is outside of a pre-determined range, wherein the alarm signal is indicative of washout or plugging.

12. The managed pressure drilling system as claimed in claim 11, wherein the sensor for measuring the differential pressure of the material in the system across the choke valve comprises a first pressure sensor upstream of the choke valve for measuring the pressure of a material in the system upstream of the choke valve, and a second pressure sensor downstream of the choke valve for measuring the pressure of the material in the system downstream of the choke valve.

13. The managed pressure drilling system as claimed in claim 11, wherein the sensor for measuring the differential pressure of the material in the system across the choke valve comprises a differential pressure sensor.

14. The managed pressure drilling system as claimed in claim 11, further comprising a density sensor for measuring the density of the material passing across the choke valve.

15. The managed pressure drilling system as claimed in claim 11, further comprising a processor to which the sensors are connected.

* * * * *